United States Patent
Tebje et al.

(10) Patent No.: US 12,031,820 B2
(45) Date of Patent: Jul. 9, 2024

(54) MICROMECHANICAL SYSTEM, METHOD FOR OPERATING A MICROMECHANICAL SYSTEM

(71) Applicant: Robert Bosch GmbH, Stuttgart (DE)

(72) Inventors: Lars Tebje, Reutlingen (DE); Johannes Classen, Reutlingen (DE); Christof Schwenk, Stuttgart (DE); Holger Rumpf, Reutlingen (DE); Joerg Braeuer, Nehren (DE); Torsten Ohms, Vaihingen/Enz-Aurich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/393,629

(22) Filed: Aug. 4, 2021

(65) Prior Publication Data
US 2022/0049958 A1    Feb. 17, 2022

(30) Foreign Application Priority Data

Aug. 11, 2020 (DE) .......................... 102020210121.3

(51) Int. Cl.
*G01C 19/5656*   (2012.01)
*G01P 1/00*    (2006.01)

(52) U.S. Cl.
CPC .......... *G01C 19/5656* (2013.01); *G01P 1/003* (2013.01)

(58) Field of Classification Search
CPC .............................. G01C 19/565; G01P 1/003
See application file for complete search history.

(56) References Cited

U.S. PATENT DOCUMENTS

| 5,008,774 A * | 4/1991 | Bullis ................. G01P 15/0802 73/514.32 |
| 5,914,553 A * | 6/1999 | Adams ............... H03H 9/02409 310/309 |
| 2003/0217597 A1 | 11/2003 | Kumagai et al. |
| 2006/0266118 A1* | 11/2006 | Denison ............ G01C 19/5719 73/514.32 |
| 2007/0267939 A1* | 11/2007 | Borovic ................. H02N 1/008 310/309 |
| 2009/0320592 A1 | 12/2009 | Glenn |
| 2010/0050771 A1 | 3/2010 | Je et al. |
| 2011/0030472 A1* | 2/2011 | Aziz ................... G01P 15/0802 216/13 |
| 2012/0031185 A1* | 2/2012 | Classen ................ G01P 15/125 73/514.14 |
| 2013/0104656 A1* | 5/2013 | Smith ..................... G01P 1/003 73/514.16 |

(Continued)

FOREIGN PATENT DOCUMENTS

DE    102015001128 A1    8/2016

*Primary Examiner* — Kristina M Deherrera
*Assistant Examiner* — Mark A Shabman
(74) *Attorney, Agent, or Firm* — NORTON ROSE FULBRIGHT US LLP; Gerard A. Messina

(57) ABSTRACT

A micromechanical system which includes a movably suspended mass. The micromechanical system includes a damping system, the damping system including a movably suspended damping structure, the damping structure being deflectable by applying a voltage. The damping structure is designed in such a way that a frequency response and/or a damping of the movably suspended mass are/is changeable with the aid of a deflection of the damping structure.

15 Claims, 9 Drawing Sheets

(56) References Cited

U.S. PATENT DOCUMENTS

| | | | |
|---|---|---|---|
| 2014/0000366 A1* | 1/2014 | Blomqvist | G01C 19/5776 |
| | | | 73/504.12 |
| 2014/0083190 A1* | 3/2014 | Kaack | G01P 15/135 |
| | | | 73/514.01 |
| 2015/0143905 A1* | 5/2015 | Kuisma | G01P 15/131 |
| | | | 73/504.12 |
| 2015/0301075 A1* | 10/2015 | Yamanaka | G01P 1/006 |
| | | | 73/514.32 |
| 2017/0023606 A1* | 1/2017 | Naumann | G01P 15/125 |
| 2017/0088413 A1* | 3/2017 | Tanaka | B81B 3/001 |
| 2018/0024160 A1* | 1/2018 | Koenig | G01P 15/125 |
| | | | 73/514.14 |
| 2018/0252739 A1* | 9/2018 | Malvern | G01P 1/003 |

\* cited by examiner

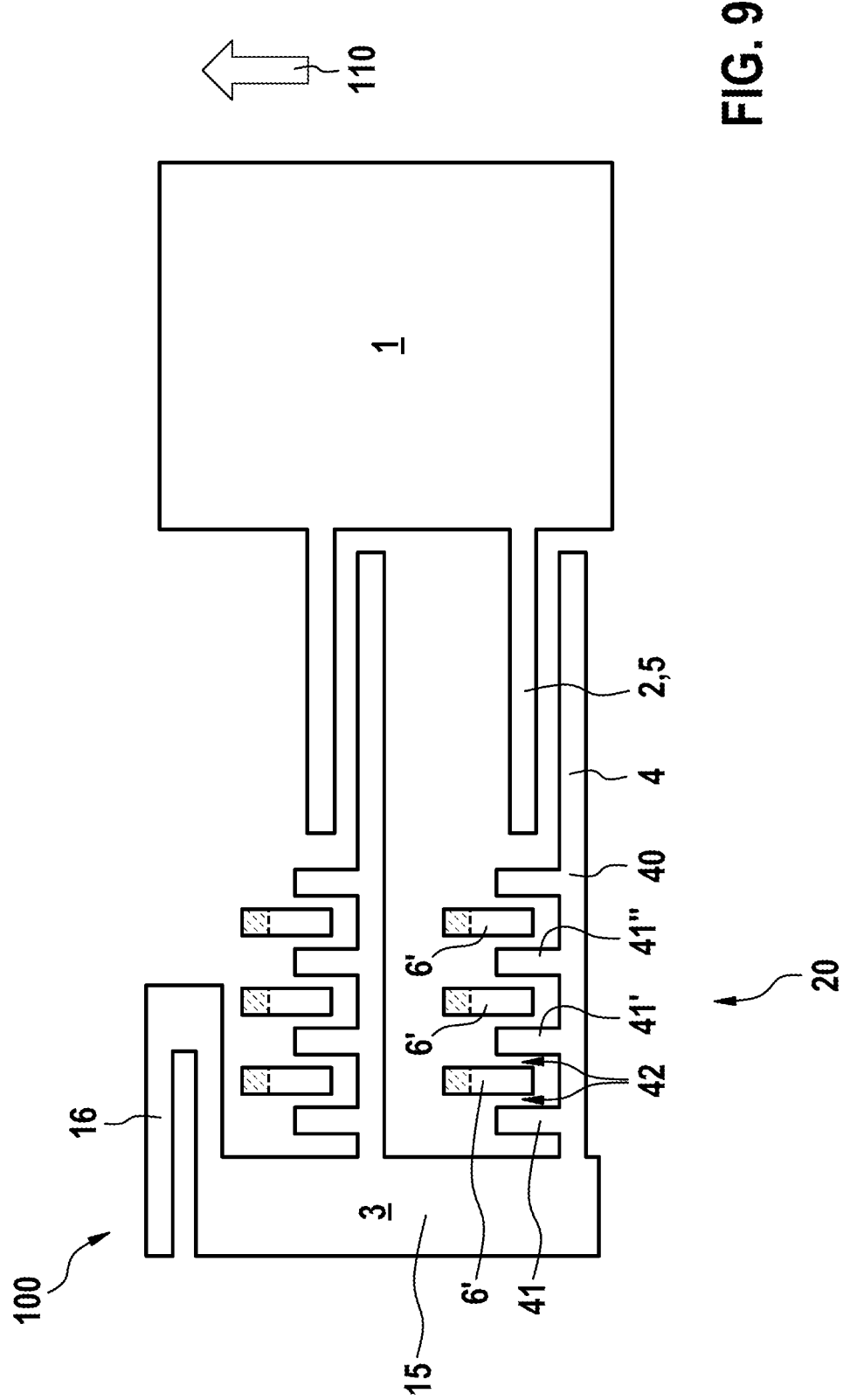

MICROMECHANICAL SYSTEM, METHOD FOR OPERATING A MICROMECHANICAL SYSTEM

FIELD

The present invention is directed to a micromechanical system.

BACKGROUND INFORMATION

Micromechanical systems are widely used, for example, as inertial sensors for measuring accelerations or rotation rates, and are employed in many areas of technology, for example in mobile telephones or automobiles, for recognizing a motion state. A targeted setting of the frequency response, in particular the natural frequency and quality or damping, is often necessary in order to adapt the sensor to the particular application. For example, an acceleration sensor, used in the automotive sector for deploying an airbag, must generally have a supercritical damping so that a possible subsequent oscillation of the sensor after encountering the actual shock is prevented in order to avoid a distortion of the measuring signal.

The related art involves a one-time tuning of the sensor for setting a certain frequency response, which is often already established by the design of the sensor during manufacture.

SUMMARY

An object of the present invention is to provide a micromechanical system in which a behavior of a movably suspended mass of the sensor may be advantageously and in particular flexibly adapted.

The micromechanical system according to example embodiments of the present invention may have the advantage over the related art that an improved and flexible adaptation of a frequency response and/or of the damping of the movably suspended mass may be carried out. The frequency response of the movably suspended mass is in particular changeable in such a way that a damping of an oscillation of the movably suspended mass and/or a frequency of an oscillation of the movably suspended mass changes as a function of the deflection of the damping structure.

It is possible according to an example embodiment of the present invention for the damping structure to be deflected relative to the substrate by applying the voltage, and thus for it to also change its position relative to the movably suspended mass (in particular with regard to the rest position of the movably suspended mass). As a result, an electrostatic force effect of the damping structure on the movably suspended mass changes, which changes the frequency response and/or the damping of the movably suspended mass. In particular, the damping of the movably suspended mass may thus be increased by the deflection or shift of the damping structure from a rest position of the damping structure.

The micromechanical system may in particular be a microelectromechanical system (MEMS), in particular a sensor and/or actuator. It is preferably possible for the micromechanical system to include an acceleration sensor and/or rotation rate sensor. According to the present invention, it is thus preferably possible to change the frequency response of a sensor with the aid of movable damping electrodes (or the damping structure). This may be used, among other things, to adapt the frequency response to certain applications, or to compensate for aging-related changes in the frequency response.

In particular, according to the present invention it is also possible to adapt a frequency and/or a damping in the sensor application, i.e., after manufacture and/or after installation of the sensor into a product, by applying an external voltage.

According to the present invention, electrostatically movable damping structures are thus possible which are coupled to the seismic masses, used for the movement detection, in such a way that the mechanical transfer function is changed. The frequency response of the sensor may thus be set or corrected with the aid of externally controllable voltages, which is advantageous for many applications involving a defined frequency response of the sensors used (airbag deployment, stability control, or structure-borne noise detection, for example).

Advantageous embodiments and refinements of the present invention are apparent from the description herein, with reference to the figures.

Due to the movably suspended mass including an electrode structure according to one specific embodiment of the present invention, the electrode structure being configured in such a way that a damping force between the electrode structure and the damping structure changes when the damping structure deflects, so that the frequency response and/or the damping of the movably suspended mass change(s) with the aid of the deflection of the damping structure, it is advantageously possible for the damping structure to be deflectable relative to the substrate and/or the movably suspended mass by applying the voltage. As a result of the change in position of the damping structure relative to the movably suspended mass, an action of force between the damping structure and the mass changes. Due to this changed action of force, the frequency response and/or the damping of the movably suspended mass (or an oscillation of the mass) are/is changed, in particular increased. The frequency response and/or the damping may thus be advantageously varied and set.

Due to the damping system including a control electrode structure according to one specific embodiment of the present invention, the damping structure being deflectable by applying the voltage to the control electrode structure and/or damping structure, it is possible to enable a controllable deflection of the damping structure via an electrostatic force between the control electrode structure and the damping structure, which allows an advantageously precise setting of the frequency response and/or the damping of the movably suspended mass. The control electrode structure is in particular fixedly and immovably connected to the substrate. The damping structure may thus be deflected from its rest position (for U=0 V) by applying voltage U. It is preferred that voltage U is applied to the control electrode structure, the damping structure and the electrode structure particularly preferably being held at the same potential.

According to one specific embodiment of the present invention, it is possible for the damping structure to be suspended with the aid of one or multiple spring structures. The spring structures allow an advantageous deflection of the damping structure relative to the substrate.

Due to the damping structure including a damping finger, in particular a group of damping fingers, according to one specific embodiment of the present invention, the electrode structure including an electrode finger, in particular a group of electrode fingers, it is possible to use plate capacitor and/or comb structures that may be advantageously manufactured. The group of damping fingers and the group of electrode fingers preferably intermesh with one another. It is preferably possible for the damping fingers of the group of damping fingers (or at least the particular main bodies of the damping fingers of the group of damping fingers) and/or the electrode fingers of the group of electrode fingers to have a bar-shaped design in each case. According to one specific embodiment of the present invention, it is provided that the damping finger or at least the main body of the damping finger extends in parallel to the electrode finger, the damping fingers of the group of damping fingers or at least the particular main bodies of the damping fingers of the group of damping fingers preferably extending in parallel to the electrode fingers of the group of electrode fingers. Accordingly, it is possible for plate and/or comb arrangements of electrodes, whose position may be changed either continuously, or abruptly or bimodally, to be used for the damping structure.

Due to the group of damping fingers including a further damping finger according to one specific embodiment of the present invention, the control electrode structure including a control electrode, the control electrode being situated between the damping finger and the further damping finger, it is possible to use finger structures or comb structures to enable a deflection of the damping structure. The damping finger and the further damping finger are preferably neighboring damping fingers. The control electrode is preferably situated between the damping finger and the further damping finger in the oscillation direction of the movably suspended mass. The control electrode preferably has a bar-shaped design.

Due to a distance between the damping finger and the control electrode being smaller than a further distance between the further damping finger and the control electrode according to one specific embodiment of the present invention, it is possible for the control electrode to be asymmetrically situated between the two damping fingers. When a voltage U is applied, the force between the damping finger and the control electrode dominates over the force between the further damping finger and the control electrode, so that the damping structure is deflected in one direction. As a result, a deflection of the damping structure from its rest position is made possible in a particularly advantageous manner by applying a voltage U.

According to one specific embodiment of the present invention, it is provided that the control electrode extends in parallel to the damping finger, or that the control electrode extends perpendicularly with respect to the damping finger and/or perpendicularly with respect to a main body of the damping finger, the damping finger preferably including one or multiple finger structures that particularly preferably extend in parallel to the control electrode. According to one embodiment, the control electrode is thus oriented and situated in particular in parallel to the damping finger and spaced apart from same. According to one alternative embodiment of the present invention, the control electrode is situated and oriented perpendicularly with respect to the damping finger and/or perpendicularly with respect to a main body of the damping finger. In this alternative embodiment, the damping finger preferably includes one or multiple finger structures which extend perpendicularly from the main body of the damping finger, and which are thus formed in parallel to the control electrode. The control electrode is in particular situated between two of the finger structures and spaced apart from each of them.

Due to the electrode finger being situated between the damping finger and the further damping finger according to one specific embodiment of the present invention, a finger distance between the electrode finger and the damping finger being less than, equal to, or greater than the distance between the damping finger and the control electrode, it is possible for at least one electrode finger of the movably suspended mass as well as at least one control electrode in each case to be situated in the space between two neighboring damping fingers. A particularly space-saving arrangement is thus possible.

Due to the micromechanical system including a stopper device according to one specific embodiment of the present invention, the deflection of the damping structure being limitable with the aid of the stopper device, it is possible for the damping structure to be maximally deflected until it strikes or comes into contact with the stopper device. A further deflection is then mechanically prevented by the stopper device. For this purpose, the damping structure may preferably include a protrusion or a finger that comes into contact with the stopper device upon a deflection of the damping structure in order to achieve a defined impact surface.

According to one specific embodiment of the present invention, a bimodal function of the damping structure is possible with the aid of the stopper device. The damping structure may be switched between a first undeflected state, in which it is in its rest position and no voltage U is applied, and a second deflected state, in which a voltage U is applied and the damping structure is deflected until it is in contact with the stopper device. The stopper device is in particular fixedly and immovably connected to the substrate.

Due to the micromechanical system including a further damping system according to one specific embodiment of the present invention, the further damping system including a further damping structure, the further damping structure being designed in such a way that the frequency response and/or the damping of the movably suspended mass are/is changeable with the aid of a deflection of the further damping structure, the further damping structure preferably being deflectable in the opposite direction from the damping structure by applying the voltage, the further damping system particularly preferably having a mirror-symmetrical design with respect to the damping system, it is advantageously possible, for symmetry reasons, for the same damping to result for a movement of the mass in the oscillation direction and opposite the oscillation direction. An improved oscillation behavior of the mass may thus be achieved.

Due to the damping structure and the control electrode structure being formed on both sides around a comb spine of the damping structure according to one specific embodiment of the present invention, it is possible to advantageously prevent undesirable torques from arising.

A further subject matter of the present invention relates to a method for operating a micromechanical system according to one specific embodiment of the present invention, the damping structure being deflected by applying a voltage, a frequency response and/or a damping of the movably suspended mass being changed with the aid of the deflection of the damping structure.

The advantages and embodiments that are described above in conjunction with the micromechanical system according to the present invention or in conjunction with a specific embodiment of the micromechanical system according to the present invention may apply to the method for operating a micromechanical system.

Exemplary embodiments of the present invention are illustrated in the figures and explained in greater detail in the following description.

BRIEF DESCRIPTION OF THE DRAWINGS

FIG. 9 shows a schematic illustration of a micromechanical system according to a sixth exemplary embodiment of the present invention.

DETAILED DESCRIPTION OF EXAMPLE EMBODIMENTS

Figure 1:
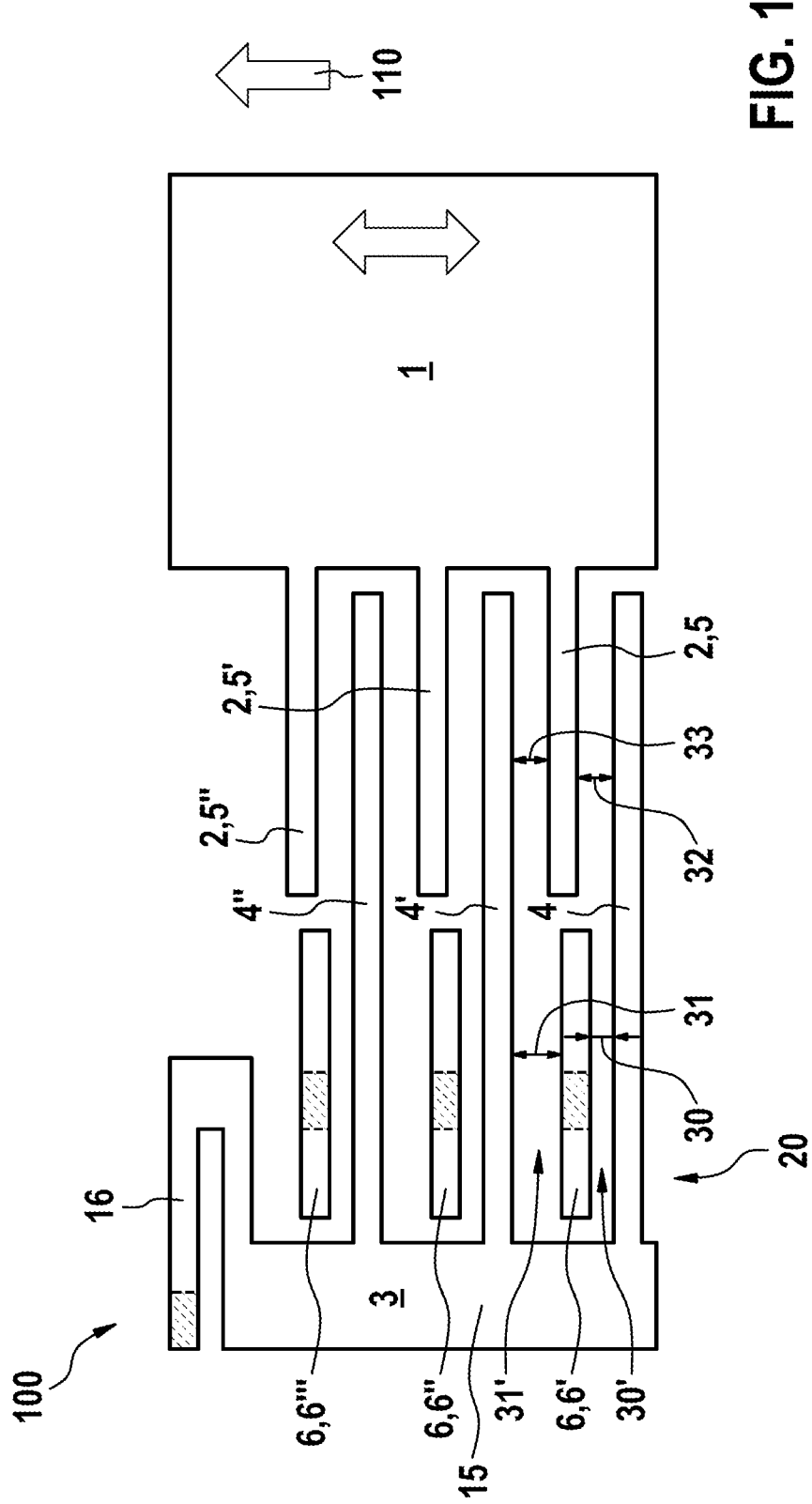
FIGS. 1 and 2 show schematic illustrations of a micromechanical system according to a first exemplary embodiment of the present invention.

Identical parts are always provided with the same reference numerals in the various figures, and therefore are generally designated or mentioned only once in each case.

Figure 2:
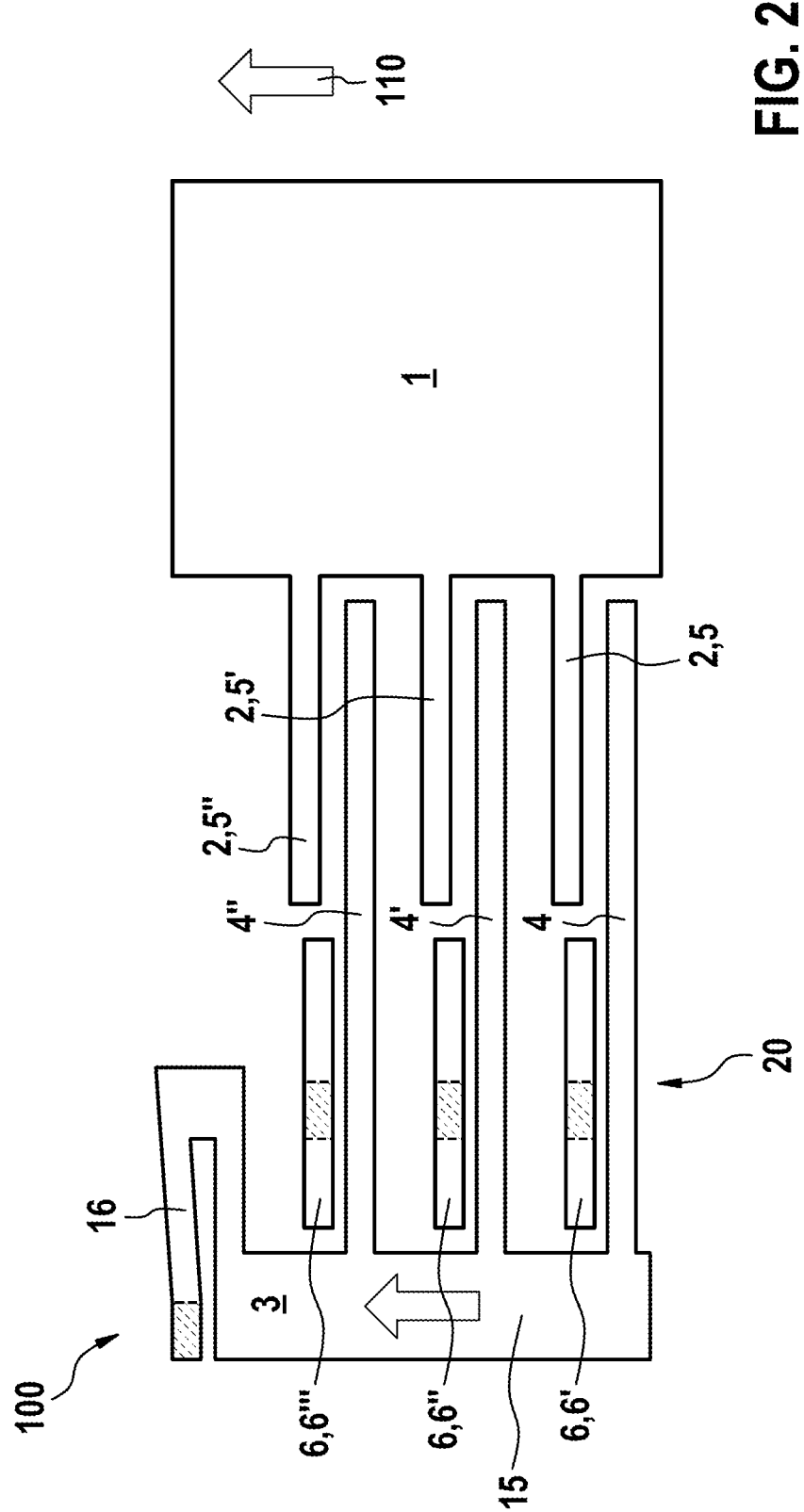

FIGS. 1 and 2 show schematic illustrations of a micromechanical system 100 according to a first exemplary embodiment of the present invention, in a top view. FIG. 1 shows damping structure 3 in a rest state (and thus shows micromechanical system 100 in a state of low damping), and FIG. 2 shows damping structure 3 in a deflected state in which damping structure 3 is deflected in oscillation direction 110 of movably suspended mass 1. Micromechanical system 100 is thus illustrated in a state of increased damping in FIG. 2.

Movably suspended mass 1 to be damped is part of micromechanical system 100, for example part of an acceleration sensor or rotation rate sensor, and is movably suspended via a spring system, for example (not illustrated here). Electrode structure 2 is situated at movably suspended mass 1, and includes a group of electrode fingers 5, 5', 5" that are fixedly connected to mass 1. Mass 1 may in particular oscillate in parallel and antiparallel to an oscillation direction 110. Further oscillation axes are also possible. Micromechanical system 100 also includes a damping system 20 that includes a damping structure 3 and a control electrode structure 6. Control electrode structure 6 is immovably connected to a substrate of the micromechanical system, and includes multiple separate control electrodes 6', 6", 6'''. Damping structure 3 is movably suspended with the aid of one or multiple springs 16. Damping structure 3 includes a group of damping fingers 4, 4', 4" that are connected to one another via a carrier bar or a comb spine 15. The group of electrode fingers 5, 5', 5" may be damped via the group of damping fingers 4, 4', 4".

An external voltage U may be applied to control electrode structure 6 in order to exert an electrostatic attractive force on damping structure 3 across gaps 30', 31', and to allow damping structure 3 to be deflected relative to mass 1 to be damped. A distance 30 between damping finger 4 and control electrode 6' is smaller than a further distance 31 between further damping finger 4' and control electrode 6'. Distances 30, 31 of gaps 30', 31' are thus asymmetrically designed, so that the force across smaller gap 30' dominates when a voltage U is applied, and damping structure 3 is always deflected in the same direction. In FIGS. 1 and 2, damping structure 3 is therefore always deflected upwardly (i.e., in oscillation direction 110) when a voltage U is applied.

If control voltage U between control electrode structure 6 and damping fingers 4, 4', 4" is U=0 V, the system is in the undeflected state, as illustrated in FIG. 1. Finger distance 32 between electrode finger 5 and damping finger 4 in the undeflected state is the same as further finger distance 33 between electrode finger 5 and further damping finger 4'. The distances of a damping finger 4, 4', 4" from each of the two neighboring electrode fingers 5, 5', 5" are thus symmetrical in the undeflected state.

If a voltage U=U0 that is different from 0 V is now applied, an electrostatic force which pulls damping structure 3 upwardly corresponding to the situation shown in FIG. 2 is exerted across gap 30'. Finger distance 32 thus also decreases, and at the same time, further finger distance 33 increases. Due to the nonlinear dependency of damping force F on gap distance d (or on finger distance d between a damping finger and an electrode finger) according to the dependency $$F \sim 1/d^3,$$

this results overall in an increased damping of movably suspended mass 1 compared to the undeflected case. As a result of the nonlinearity, the damping force across decreasing finger distance 32 increases more greatly than the force across increasing further finger distance 33 decreases.

In this way, by applying an external voltage U, the damping of an oscillation of mass 1 may be continuously varied or set with the aid of voltage U, and thus a frequency response and/or a damping of the movably suspended mass 1 may be changed. However, due to the nonlinearity of the deflection of damping structure 3 via voltage U, the deflection (at least for typical dimensions and distances) may be varied only in the range of approximately one-third of distance 30 between damping finger 4 and control electrode 6' (i.e., the width of gap 30' in the undeflected state). In addition, this results in the so-called "snapping" of damping finger 4 in the direction of control electrode 6', and thus results in the snapping of movable damping structure 3 to control electrode structure 6. Without further measures, in such a case this would result in contact and a short circuit between the group of damping fingers 4, 4', 4" and control electrode structure 6.

In the first exemplary embodiment according to FIGS. 1 and 2, distance 30 between damping finger 4 and control electrode 6' is smaller than finger distances 32, 33 between electrode fingers 5, 5', connected to mass 1, and damping finger 4. This allows a particularly compact arrangement of damping system 20. However, the maximum possible setting range of the damping is limited in this configuration. Since the change in distance 30 is limited to one-third, the relative change in finger distance 32 in the first exemplary embodiment is less than one-third.

Figure 3:
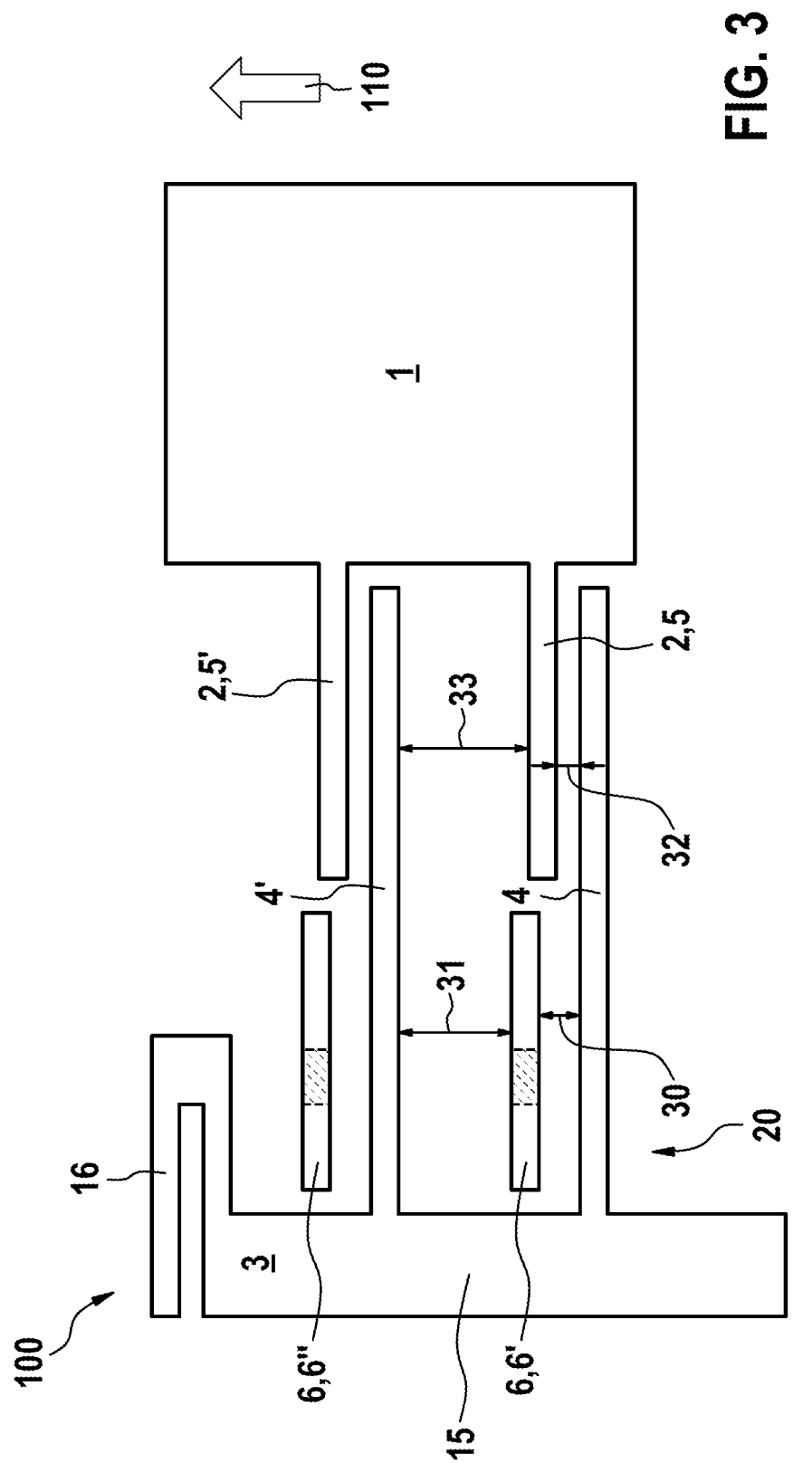
FIG. 3 shows a schematic illustration of a micromechanical system according to a second exemplary embodiment of the present invention.

FIG. 3 shows a schematic illustration of a micromechanical system 100 according to a second exemplary embodiment of the present invention in an undeflected state, according to the second exemplary embodiment an increase in the relative change in finger distance 32 between electrode finger 5 and damping finger 4 being made possible. In the second exemplary embodiment, in the undeflected state, distance 30 between damping finger 4 and control electrode 6' is greater than finger distance 32 between electrode finger 5 and damping finger 4. In this case, if the group of damping fingers 4, 4', 4" is deflected by one-third of distance 30 with the aid of control voltage U, the relative change in finger distance 32 between electrode finger 5 and damping finger 4 is much greater than one-third. According to the second exemplary embodiment, it is thus possible to effectuate a particularly large relative change in the damping via the control voltage. However, for the arrangement according to the second exemplary embodiment, somewhat more surface area may be required.

Figure 4:
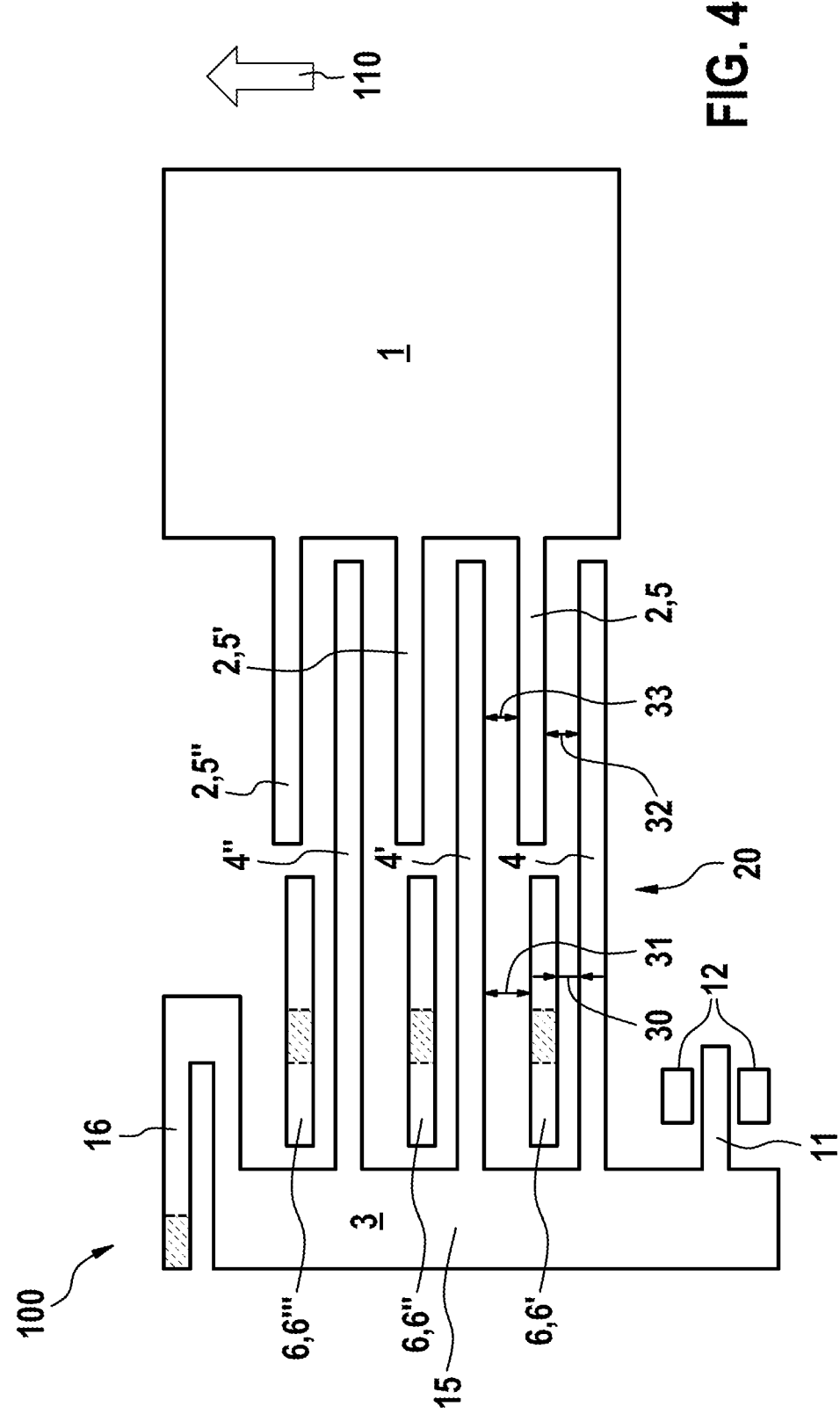
FIGS. 4 and 5 show schematic illustrations of a micromechanical system according to a third exemplary embodiment of the present invention.
Figure 5:
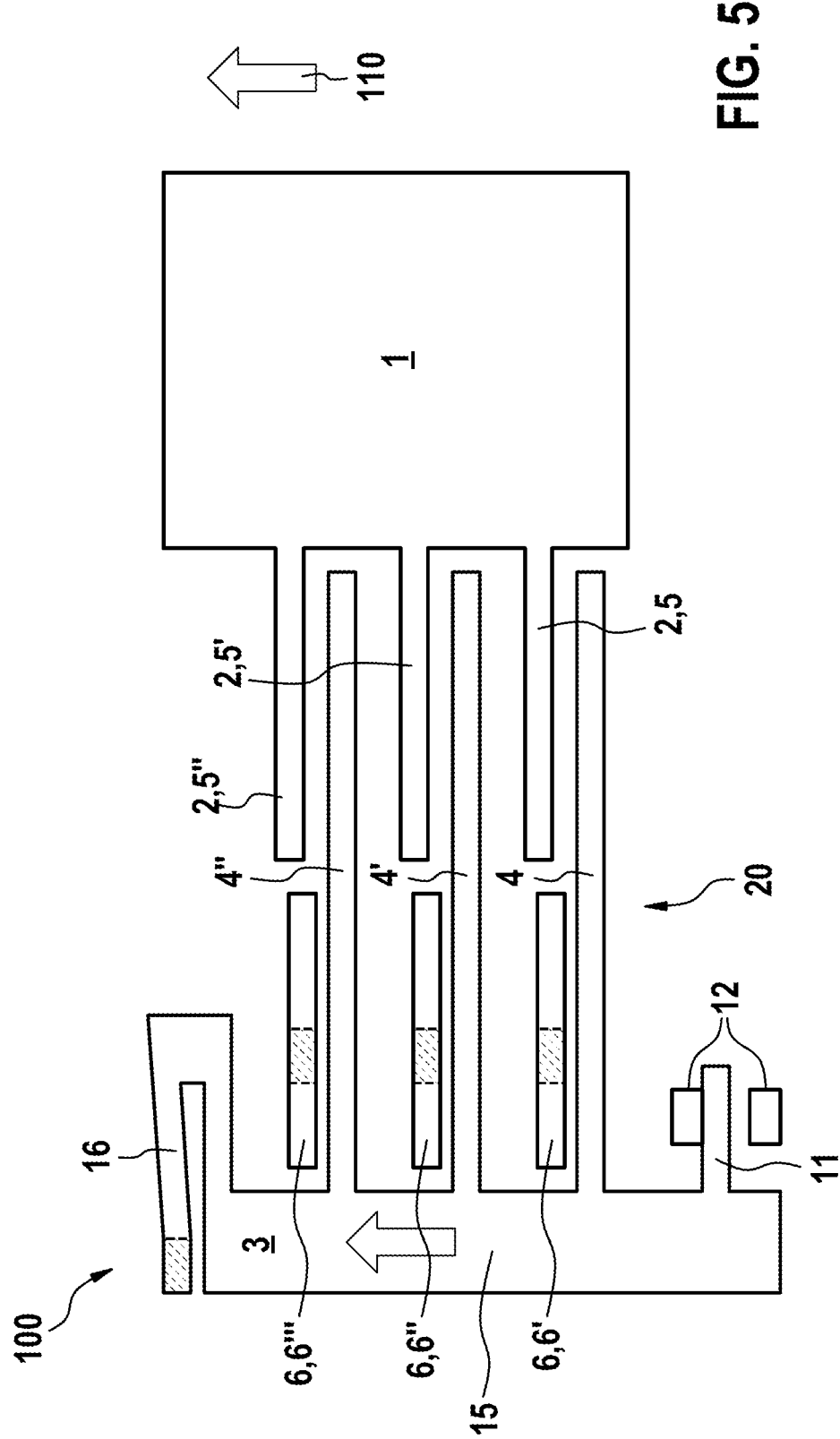

FIGS. 4 and 5 show schematic illustrations of a micromechanical system 100 according to a third exemplary embodiment of the present invention. To avoid the snapping explained in conjunction with the first exemplary embodiment, stopper devices 12 or stop structures 12 that are fixedly connected to the substrate are present in the third exemplary embodiment.

Stopper devices 12 fixed to the substrate are situated opposite from movable damping structure 3 in order to limit its deflection. Damping structure 3 includes a finger 11 that is situated in such a way that a mechanical contact is formed between finger 11 and stopper device 12 when damping structure 3 is appropriately deflected, so that damping structure 3 is stopped and a further deflection of damping structure 3 is prevented.

With the aid of stopper device 12, there is also the option to define a targeted damping level in the "snapped" state, i.e., in the state in which stopper device 12 and damping structure 3 come into contact. A defined residual distance for finger distance 32 between electrode finger 5 and damping finger 4 upon contact of stopper device 12 and damping structure 3 is settable by selecting the distance between stopper device 12 and damping structure 3 (in parallel to oscillation direction 110). Thus, with the aid of voltage U, a switch may be made back and forth between low damping (FIG. 4—no deflection of damping structure 3) and high damping (FIG. 5—deflected state of damping structure 3 and contact between damping structure 3 and stopper device 12), so that a bimodal function or an abrupt change between the two damping levels is made possible. Additionally or alternatively, in this specific embodiment it is possible for distance 30 between damping finger 4 and control electrode 6' to be continuously variable in the range of in particular one-third of distance 30 (width of gap 30' in the rest state) in order to make a continuous variation in the damping possible.

One possible disadvantage of the exemplary embodiments described thus far is an asymmetrical damping with regard to the direction of the deflection of movably suspended mass 1 to be damped. In the upwardly deflected state of mass 1 (in particular in oscillation direction 110), the damping across dominating finger distance 32 would be greater than in the downwardly deflected state of mass 1 (in particular in the direction opposite oscillation direction 110). This results in a nonlinear behavior of the sensor overall.

Figure 6:
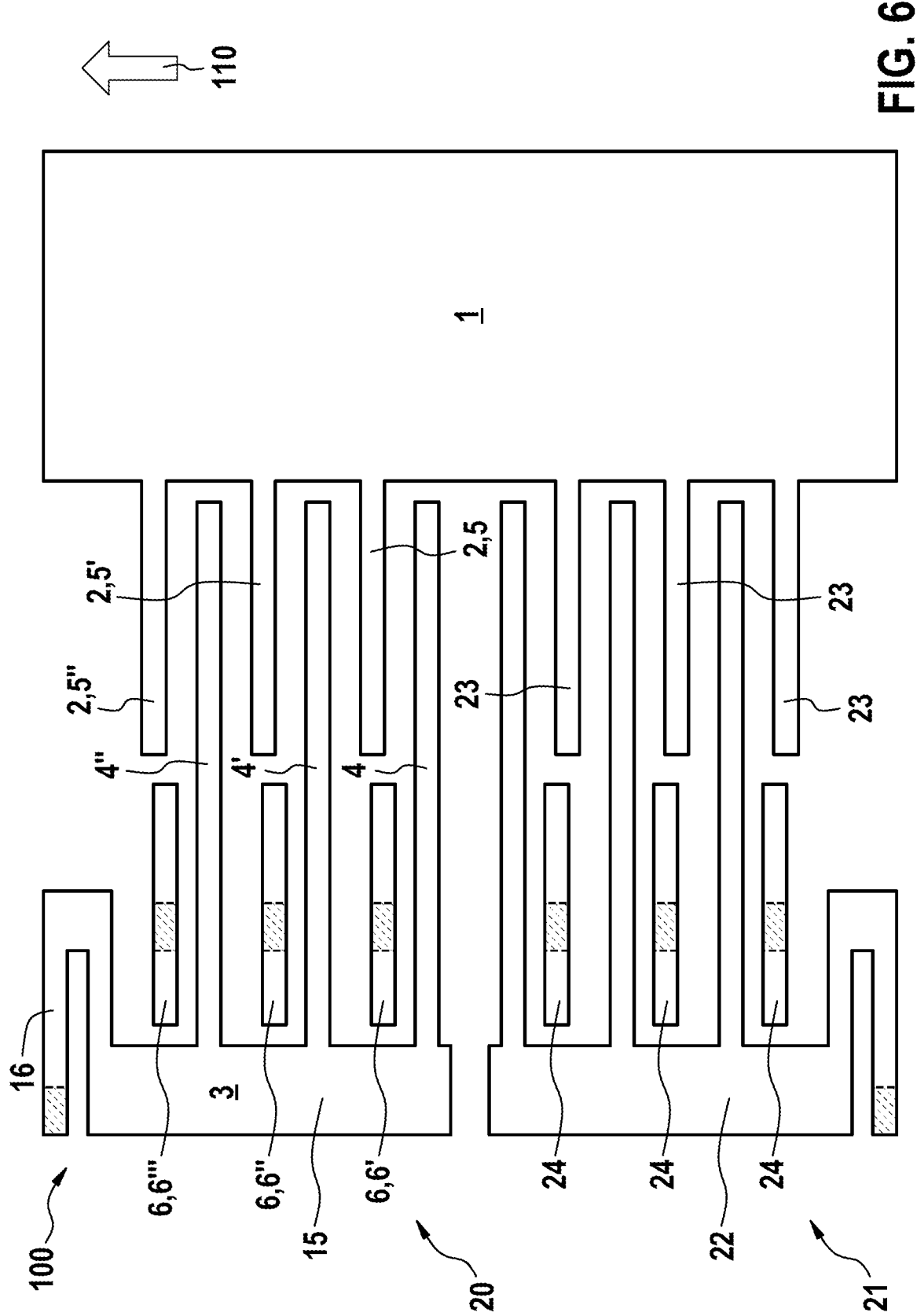
FIGS. 6 and 7 show schematic illustrations of a micromechanical system according to a fourth exemplary embodiment of the present invention.
Figure 7:
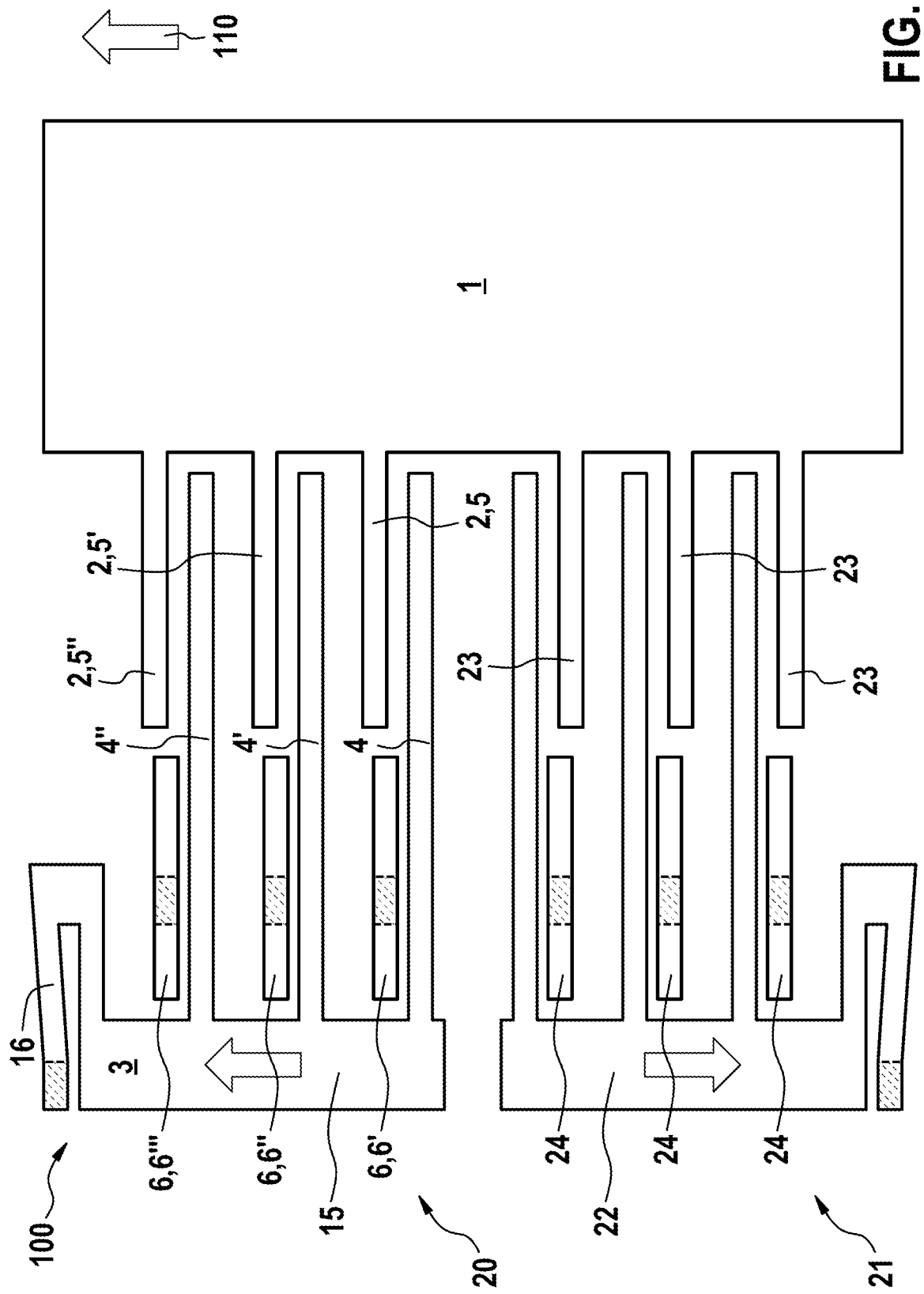

FIGS. 6 and 7 show schematic illustrations of a micromechanical system 100 according to a fourth exemplary embodiment of the present invention, via which such a possible disadvantage may be eliminated. In addition to damping system 20, micromechanical system 100 includes a further damping system 21 which has a mirror-symmetrical design with respect to damping system 20 and which is likewise used to change the frequency response and/or the damping of mass 1. Further damping system 21 has a mirror-symmetrical design with respect to damping system 20 with regard to a plane of symmetry extending perpendicularly with respect to oscillation direction 110. Accordingly, further damping system 21 includes the same (but mirror-symmetrically situated) structures and elements as damping system 20, in particular a corresponding further damping structure 22 including a group of damping fingers, an electrode structure 23 including a group of electrode fingers, and a control electrode structure 24 including a group of control electrodes.

FIG. 6 shows damping system 20 and further damping system 21 in the undeflected rest state without applied voltage U, and FIG. 7 shows a deflected state with applied voltage U. For setting a high damping, the two damping structures 3, 22 are deflected mirror-symmetrically. When voltage is applied, damping structure 3 is deflected in oscillation direction 110, and further damping structure 22 is deflected in the direction opposite oscillation direction 110 (FIG. 7). When mass 1 is deflected in oscillation direction 110, for symmetry reasons the same damping results for mass 1 as in the case of a deflection of mass 1 in the direction opposite oscillation direction 110. An improved oscillation behavior of mass 1 may thus be achieved.

Figure 8:
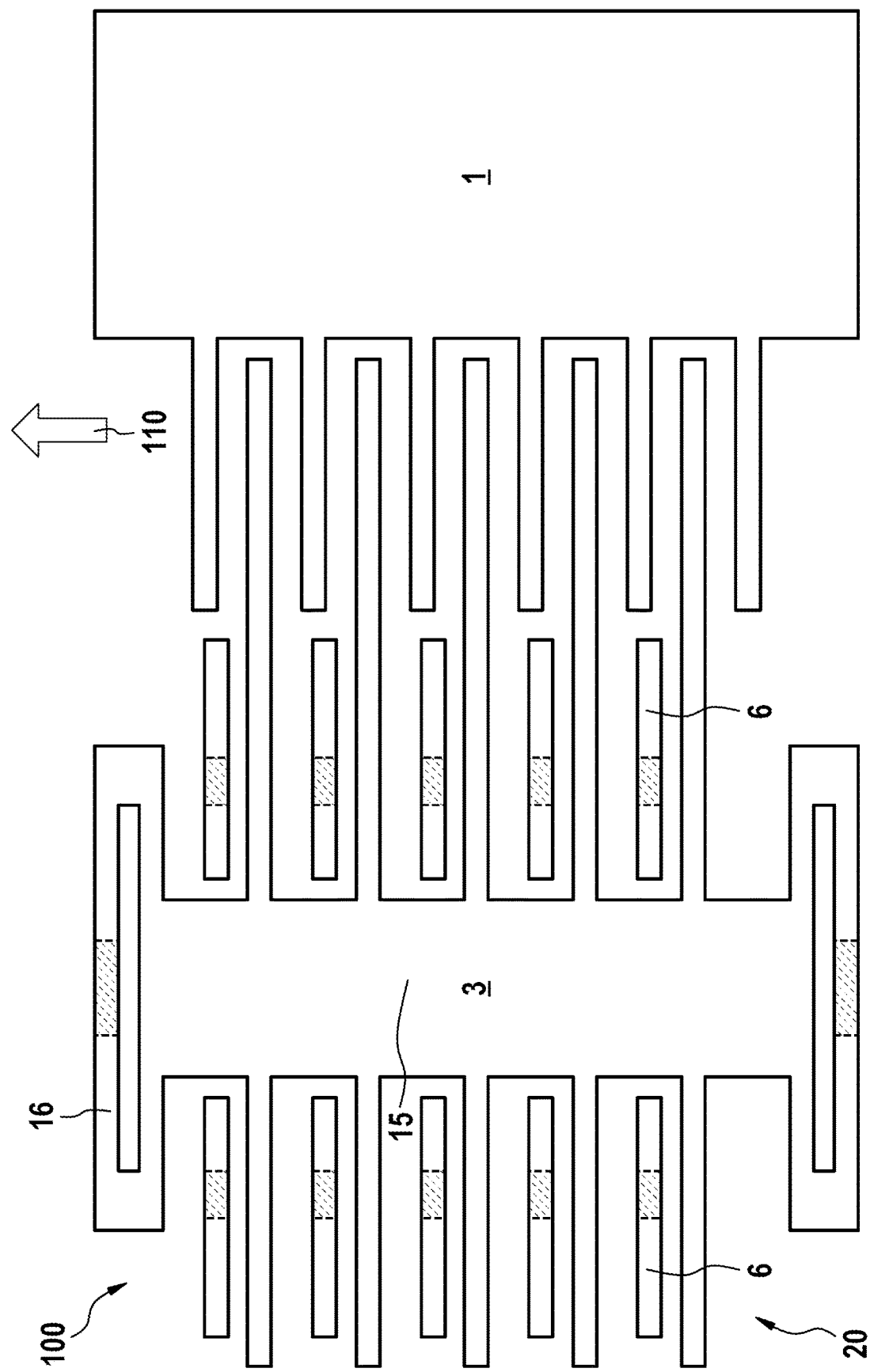
FIG. 8 shows a schematic illustration of a micromechanical system according to a fifth exemplary embodiment of the present invention.

In the exemplary embodiments shown, applying a voltage U to control electrode structure 6 may result in an undesirable torque due to forces on one side, since the group of damping fingers 4, 4', 4" of damping structure 3 is situated only on one side (right side) of carrier bar or comb spine 15. In one refinement, it is therefore possible to symmetrize the force acting on the system by situating electrodes on both sides (for example, via damping fingers that are situated on both sides of carrier bar or comb spine 15). FIG. 8 shows a schematic illustration of a micromechanical system 100 according to such a fifth exemplary embodiment of the present invention. Damping structure 3 and control electrode structure 6 are formed on both sides of comb spine 15.

FIG. 9 shows a schematic illustration of a micromechanical system 100 according to a sixth exemplary embodiment of the present invention. In this case, control electrodes 6', 6", 6'" used for deflecting damping structure 3 are in each case designed as comb electrodes (without a comb spine or carrier bar). The comb structures of control electrodes 6' each extend perpendicularly with respect to main body 40 of damping finger 4, and thus in parallel to oscillation direction 110. To form a comb electrode configuration, webs or finger structures 41, 41', 41" that extend perpendicularly (and thus in parallel to oscillation direction 100), starting from main body 40, are also mounted on main bodies 40 of damping fingers 4, 4', 4". The electrostatic field that forms in gaps 42 between finger structures 41, 41', 41" and control electrodes 6' when a voltage U is applied results in a deflection of damping structure 3 in oscillation direction 100. Comb electrodes offer the advantage of a linear deflection as a function of applied voltage U, so that, in contrast to plate electrodes, snapping is avoidable in a particularly advantageous manner. This makes a more finely graduated damping variation possible.

The features of the various exemplary embodiments may be arbitrarily combined with one another. In particular, it is possible for comb electrodes according to FIG. 9, a symmetrical damping structure 3 according to FIG. 8, stop structures or stopper devices 12 according to FIGS. 4 and 5, and/or a symmetry enhancement according to FIGS. 6 and 7 to be arbitrarily combined with one another, as the result of which the corresponding advantageous effects may also be combined.

What is claimed is:

1. A micromechanical system, comprising:
   a movably suspended mass; and
   a damping system including a movably suspended damping structure, the damping structure being deflectable by applying a voltage, the damping structure being configured in such a way that a frequency response of the movably suspended mass is changeable as a function of a deflection of the damping structure,
wherein the micromechanical system includes a stopper device, the deflection of the damping structure being limitable as a function of the stopper device,
wherein a targeted damping level, in which the stopper device and the damping structure come into contact, is settable by selecting a predefined distance between the stopper device and the damping structure.

2. The micromechanical system as recited in claim 1, wherein the movably suspended mass includes an electrode structure, the electrode structure being configured in such a way that a damping force between the electrode structure and the damping structure changes upon the deflection of the damping structure, so that the frequency response and/or the damping of the movably suspended mass changes as a function of the deflection of the damping structure.

3. The micromechanical system as recited in claim 2, wherein the damping structure includes a damping finger, and the electrode structure includes an electrode finger.

4. The micromechanical system recited in claim 3, wherein the damping structure includes a further damping finger, the control electrode structure includes a control electrode, the control electrode being situated between the damping finger and the further damping finger.

5. The micromechanical system as recited in claim 4, wherein a distance between the damping finger and the control electrode is smaller than a further distance between the further damping finger and the control electrode.

6. The micromechanical system as recited in claim 5, wherein the electrode finger is situated between the damping finger and the further damping finger, a finger distance between the electrode finger and the damping finger being less than, equal to, or greater than the distance between the damping finger and the control electrode.

7. The micromechanical system as recited in claim 4, wherein:
the control electrode extends in parallel to the damping finger, or
the control electrode extends perpendicularly with respect to the damping finger and/or perpendicularly with respect to a main body of the damping finger.

8. The micromechanical system as recited in claim 7, wherein the damping finger includes one or multiple finger structures that extend in parallel to the control electrode.

9. The micromechanical system as recited in claim 1, wherein the damping system includes a control electrode structure, the damping structure being deflectable by applying the voltage to the control electrode structure and/or damping structure.

10. The micromechanical system as recited in claim 1, wherein the micromechanical system includes a further damping system, the further damping system including a further damping structure, the further damping structure being configured in such a way that the frequency response and/or the damping of the movably suspended mass is changeable as a function of a deflection of the further damping structure, the further damping structure being deflectable in an opposite direction from the damping structure by applying the voltage.

11. The micromechanical system as recited in claim 10, wherein the further damping system has a mirror-symmetrical configuration with respect to the damping system.

12. The micromechanical system as recited in claim 1, wherein the damping structure and the control electrode structure are formed on both sides around a comb spine of the damping structure.

13. The micromechanical system as recited in claim 1, wherein the damping structure is configured in such a way that a damping of the movably suspended mass is changeable as a function of a deflection of the damping structure.

14. A method for operating a micromechanical system, the micromechanical system including a movably suspended mass, and a damping system including a movably suspended damping structure, the damping structure being deflectable by applying a voltage, the damping structure being configured in such a way that a frequency response and/or a damping of the movably suspended mass is changeable as a function of a deflection of the damping structure, the method comprising:
deflecting the damping structure by applying the voltage, the frequency response of the movably suspended mass being changed as a function of the deflection of the damping structure,
wherein the micromechanical system includes a stopper device, the deflection of the damping structure being limitable as a function of the stopper device,
wherein a targeted damping level, in which the stopper device and the damping structure come into contact, is settable by selecting a predefined distance between the stopper device and the damping structure.

15. The method as recited in claim 14, wherein the damping structure is configured in such a way that a damping of the movably suspended mass is changeable as a function of a deflection of the damping structure.

\* \* \* \* \*